(12) United States Patent
Shroff et al.

(10) Patent No.: US 8,949,586 B2
(45) Date of Patent: Feb. 3, 2015

(54) SYSTEM AND METHOD FOR AUTHENTICATING COMPUTER SYSTEM BOOT INSTRUCTIONS DURING BOOTING BY USING A PUBLIC KEY ASSOCIATED WITH A PROCESSOR AND A MONITORING DEVICE

(75) Inventors: Chirag K. Shroff, Apex, NC (US); Anthony H. Grieco, Wake Forest, NC (US)

(73) Assignee: Cisco Technology, Inc., San Jose, CA (US)

( * ) Notice: Subject to any disclaimer, the term of this patent is extended or adjusted under 35 U.S.C. 154(b) by 199 days.

(21) Appl. No.: 13/267,795

(22) Filed: Oct. 6, 2011

(65) Prior Publication Data

US 2013/0091345 A1 Apr. 11, 2013

(51) Int. Cl.
| | |
|---|---|
| *G06F 9/00* | (2006.01) |
| *G06F 15/177* | (2006.01) |
| *H04L 9/32* | (2006.01) |
| *H04L 29/06* | (2006.01) |
| *G06F 21/00* | (2013.01) |
| *G06F 21/57* | (2013.01) |

(52) U.S. Cl.
CPC .......... *H04L 9/3234* (2013.01); *H04L 63/0823* (2013.01); *G06F 21/00* (2013.01); *H04L 9/3263* (2013.01); *H04L 9/3247* (2013.01); *G06F 21/575* (2013.01)
USPC .......................................................... 713/2

(58) Field of Classification Search
CPC ........... G06F 21/00; G06F 21/57; H04L 9/00; H04L 63/0823; H04L 9/3263; H04L 9/3247
See application file for complete search history.

(56) References Cited

U.S. PATENT DOCUMENTS

| | | | |
|---|---|---|---|
| 7,017,038 B1 | 3/2006 | LaChance et al. | |
| 7,424,398 B2 | 9/2008 | Booth et al. | |
| 7,761,717 B2 | 7/2010 | Moller et al. | |
| 2006/0136708 A1* | 6/2006 | Hajji et al. | 713/2 |
| 2008/0052526 A1* | 2/2008 | Dailey et al. | 713/186 |
| 2008/0059818 A1* | 3/2008 | Blinick et al. | 713/300 |
| 2008/0163383 A1* | 7/2008 | Kumar et al. | 726/29 |
| 2008/0222407 A1* | 9/2008 | Carpenter et al. | 713/2 |
| 2008/0270782 A1* | 10/2008 | Bone et al. | 713/2 |

(Continued)

OTHER PUBLICATIONS

U.S. Appl. No. 13/114,831 entitled "Method and Apparatus for Securing CPUS Booted Using Attached Flash Memory Devices," filed May 24, 2011; Inventor(s): Anthony H. Grieco.

(Continued)

*Primary Examiner* — Thomas Lee
*Assistant Examiner* — Zhipeng Wang
(74) *Attorney, Agent, or Firm* — Patent Capital Group (57) ABSTRACT

Various systems, processes, and products may be used to authenticate computer system boot instructions. In particular implementations, a system, process, and product for authenticating computer system boot instructions may include the ability to determine, according to pre-boot computer system instructions, whether a public key associated with the boot instructions is authentic using a public key associated with a central processing unit. The system, process, and product may also include the ability to determine, if the public key associated with boot instructions is authentic, whether the boot instructions are authentic using the public key associated with boot instructions. The system, process, and product may further include the ability to launch the boot instructions if the boot instructions are authentic.

25 Claims, 4 Drawing Sheets

(56) References Cited

U.S. PATENT DOCUMENTS

| | | | |
|---|---|---|---|
| 2009/0113558 A1* | 4/2009 | Prabhakaran et al. | 726/27 |
| 2009/0172377 A1* | 7/2009 | Gueron et al. | 713/2 |
| 2009/0276617 A1* | 11/2009 | Grell et al. | 713/2 |
| 2010/0070800 A1 | 3/2010 | Hanna | |
| 2010/0199077 A1* | 8/2010 | Case et al. | 713/1 |
| 2011/0078430 A1 | 3/2011 | McCoull et al. | |
| 2011/0271090 A1* | 11/2011 | Zimmer et al. | 713/2 |
| 2011/0280402 A1* | 11/2011 | Ibrahim et al. | 380/277 |

OTHER PUBLICATIONS

"Console Hacking 2010 Part 2—Chaos Communication Congress," uploaded by PSGroove.com on YouTube on Dec. 29, 2010; 2 pages http://www.youtube.com/watch?v=X8oh0y8_X04&NR=1.

"ENS491 Progress Report 1, #001 Development of a Microcomputer Education Platform," Group 8136 Mehmet Selim Yavuz, Sabanci Universitesi, Oct. 10, 2010, © Sabaci University; 5 pages https://www.sabanciuniv.edu/mdbf/fensware/ugprojects/ens4912.php?term=16.

"failOverflow—PS3 Private Key + PSP Key + PS3's Blu-Ray Key found, FW 3.50 decrypted," posted Dec. 29, 2010, NeoGAF, 16 pages http://www.neogaf.com/forum/showthread.php?t=417173.

"Hackers Leave PS3 Security in Tatters," Digital Foundry, Jan. 3, 2011, Eurogamer.net, © 1999-2011 Eurogamer Network Ltd., 3 pages; http://www.eurogamer.net/articles/digitalfoundry-ps3-security-in-tatters.

"Is This True About Cell Processor?," Beyond 3D Forum, posted Aug. 1, 2005, 8 pages http://forum.beyond3d.com/showthread.php?p=534985.

"PS3 Chips—Reviews of Best Playstation 3 Mod Chips," © 2008 PS3-Chips.com; 4 pages http://www.ps3-chips.com/.

USPTO May 30, 2013 Non-Final Office Action from U.S. Appl. No. 13/114,831.

USPTO Dec. 13, 2013 Final Office Action from U.S. Appl. No. 13/114,831.

USPTO Mar. 28, 2014 Non-Final Office Action from U.S. Appl. No. 13/114,831.

USPTO Sep. 9, 2014 Final Office Action from U.S. Appl. No. 13/114,831.

* cited by examiner

SYSTEM AND METHOD FOR AUTHENTICATING COMPUTER SYSTEM BOOT INSTRUCTIONS DURING BOOTING BY USING A PUBLIC KEY ASSOCIATED WITH A PROCESSOR AND A MONITORING DEVICE

TECHNICAL FIELD

The present disclosure relates generally to computer systems, and more specifically, to boot instructions for computer systems.

BACKGROUND

Modern computer systems are often controlled by programs (e.g., software and/or firmware), which may be packaged with the computer systems when shipped. Unfortunately, most programs, even those encapsulated as firmware, are relatively easy to change and/or swap out (e.g., by unauthorized manufacturers or distributors). Thus, computer systems designed for a specific purpose may be modified to perform unintended operations, which may reflect negatively on the manufacturer of the computer system. Moreover, it may prevent clients from receiving the computer systems that they are expecting. To combat this, manufacturers of central processing units have begun placing security measures in their chips, but even these have been thwarted by the surreptitious replacement of the processors.

DETAILED DESCRIPTION OF EXAMPLE EMBODIMENTS

Overview

In one general example implementation, a procedure for authenticating computer system boot instructions may include determining, according to pre-boot computer system instructions, whether a public key associated with the boot instructions is authentic using a public key associated with a central processing unit. The procedure may also include determining, if the public key associated with boot instructions is authentic, whether the boot instructions are authentic using the public key associated with boot instructions. The procedure may also include launching (e.g., initiating, starting, triggering, etc.) the boot instructions if the boot instructions are authentic.

Example Embodiments

Figure 1:
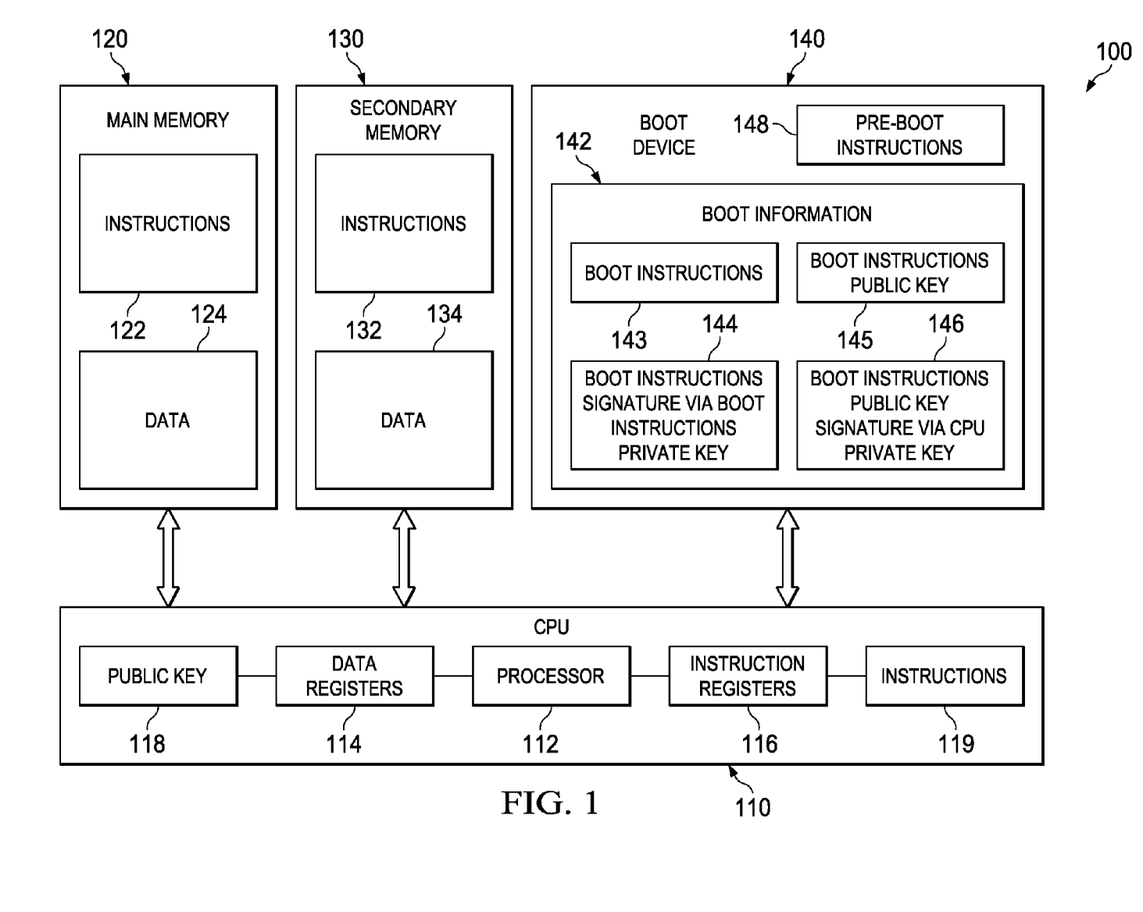
FIG. 1 is a block diagram illustrating an example system for authenticating computer system boot instructions in accordance with one embodiment of the present disclosure.

FIG. 1 illustrates an example system 100 for authenticating boot instructions. System 100 may include a central processing unit 110, a main memory 120, a secondary memory 130, and a boot device 140. In some implementations, central processing unit 110 may be coupled to main memory 120, secondary memory 130, and boot device 140 through one or more chips that implement the core logic for system 100. In particular implementations, a logic chip set may include two chips, one for controlling faster capabilities (e.g., for accessing main memory 120 and/or graphics capabilities) and a second for controlling slower capabilities (e.g., for accessing secondary memory 130, boot device 140, peripherals, and computer networks).

Central processing unit 110 can include a processor 112, data registers 114, and instruction registers 116. Processor 112 can be responsible for processing data under the direction of instructions (e.g., from firmware and/or software). Processor 112 may, for example, include an execution core (e.g., having one or more arithmetic logical units) for processing data, an instruction fetch unit for fetching and ordering instructions for execution, and an instruction queue, to which the instruction fetch unit dispatches instructions and from which instructions are issued to the execution core for execution.

Data registers 114 can locally store the data on which processor 112 operates (e.g., source operands). The data stored by the registers may, for example, include fixed-point values, floating-point values, vector values, decimal values, condition code values, count values, and/or any other appropriate type of data. Data registers 114 also store the data that results from processor operations (e.g., destination operands). The data may also be stored at different locations (e.g., main memory 120 and/or secondary memory 130). In particular implementations, data registers 114 may be general purpose registers. Thus, they may store data or pointers (e.g., addresses) to data. Instruction registers 116 can locally store the instructions that processor 112 executes (e.g., opcodes). The instructions may also be stored at different locations (e.g., main memory 120 and/or secondary memory 130).

Central processing unit 110 also includes a public key 118 and instructions 119. Public key 118 can be associated with central processor unit 110 and may, for example, be a public encryption key in a Public Key Cryptography system, which can be an asymmetric key encryption scheme in which one key is distributed (i.e., the public key) and one key is kept private (i.e., the private key), and if one key is used to encrypt a set of data, the other would be used to decrypt it. Public key 118 can be stored in non-volatile memory and, in particular implementations, may be encoded in central processing unit 110. Instructions 119 may be executed by processor 112 before attempting to access boot device 140. In particular implementations, instructions 119 may be microcode or implemented as a state machine. Instructions 119 are typically not mutable.

Main memory 120 can include instructions 122 and data 124. Main memory 120 is often larger than register memory. Thus, Instructions 122 may be an enlarged list of the instructions being executed by processor 112, which together form one or more programs. The programs may, for example, be applications (e.g., for home, business, or scientific purposes) and an operating system. Data 124 may be an enlarged set of the data being operated on by processor 112. Thus, data 124 may be required for and produced by instructions 122. Instruction registers 116 may store specific instructions from main memory 120 as needed, and data registers 114 may store specific data from main memory 120 as needed. In particular implementations, main memory 120 may include random access memory (RAM).

Secondary memory 130 can include instructions 132 and data 134. Secondary memory 130 is often larger than main memory 120. Thus, instructions 132 may be an enlarged list of the instructions being executed by processor 112, which together form one or more programs. The programs may, for example, be applications (e.g., for home, business, scientific, purposes) and an operating system. Data 134 may be an enlarged set of the data being operated on by processor 112. Thus, data 134 may be required for and produced by instructions 132. Instructions 132 and data 134 may be moved from secondary memory 130 to main memory 120 as needed. In particular implementations, secondary memory 130 may include disc memory.

Boot device 140 can include a boot information module 142 and a pre-boot instruction module 148. Boot information module 142 can include boot instructions 143. Boot instructions 143 may, for example, identify and initialize hardware (e.g., video display card, keyboard, mouse, hard disk drive, and/or any other appropriate device) for system 100 and load an operating system (e.g., Windows, Unix, or Linux), which is typically located in secondary memory 130 for a cold start. The operating system then loads and takes over control of system 100. Boot instructions 143 may, for instance, include a basic input-output system (BIOS) and/or an extensible firmware interface (EFI). Moreover, the boot instructions may have been generated by or for the original equipment manufacturer (OEM) for system 100.

As will be discussed in more detail later, boot information module 142 also includes a digital signature 144 for the boot instructions that has been signed with a private key associated with the boot instructions, a public key 145 associated with the boot instructions, and a digital signature 146 for the boot instructions public key that has been signed with a private key associated with public key 118 of central processing unit 110. In particular implementations, signature 146 may be generated by the manufacturer of central processing unit 110 using the private key associated with public key 118 to sign one or more of public keys of the OEM for system 100.

Pre-boot instruction module 148 may be used to authenticate boot instructions 143. In particular implementations, pre-boot instruction module 148 may be a BIOS verification module. Boot device 140 may, for example, be implemented on a chip, and may include non-volatile memory for storing boot information 142 and pre-boot instructions 148. The non-volatile memory may, for example, be read-only memory (ROM), electronically erasable read-only memory (EEPROM), or Flash memory. Thus, although non-volatile, in particular implementations, the memory may be overwritten.

System 100 can be provisioned in any suitable environment such as being provided (for example) in a router, a switch, a gateway, a proprietary device, a network appliance, a bridge, a console, a telephone, a computer, a personal digital assistant (PDA), a laptop or electronic notebook, an i-Phone, an iPad, a Google Droid, any other type of smartphone, or in any other suitable electronic device, component, etc. In certain modes of operation, when system 100 is being started (by a cold start or a warm start), central processing unit 110 performs operations as dictated by instructions 119 before performing pre-boot instructions 148. In particular instances, instructions 119 may dictate the authentication of pre-boot instructions 148 of boot device 140. For example, pre-boot instructions 148 may be authenticated using public key 119 of central processing unit 110. A digital signature of all or a portion of the pre-boot instructions may, for instance, be created by hashing the instructions to be authenticated and encrypting the hash value with the private key of the central processing unit. The signature may then be located with the pre-boot instructions (which may be in an encrypted or unencrypted mode). Processor 112, under the direction of instructions 119, may then decrypt the digital signature using public key 119 and perform the same hash function on pre-boot instructions 148. If the hash function produces the same value as the decrypted value, the central processing unit may have a high confidence that pre-boot instructions 148 are associated with it and have not been tampered with.

Once operations dictated by instructions 119 have been performed, boot instructions 143 may be authenticated according to pre-boot instructions 148. Boot instructions 143 may, for example, be authenticated by first validating public key 145 for the boot instructions. Public key 145 may, for example, be validated by using public key 118 of central processing unit 110. Using public key 118, processor 112 may analyze public key 145 using its digital signature 146, which may be a hash value of the public key that has been encrypted with the private key of central processing unit 110. For example, processor 112, under the direction of pre-boot instructions 148, may decrypt digital signature 146 using public key 119 and perform a hash function on public key 145. If the hash function produces the same value as the decrypted hash value, pre-boot instructions 148 may have a high confidence that public key 145 is associated with the central processing unit and has not been tampered with.

Once boot instructions public key 145 has been authenticated, boot instructions 143 may be authenticated. The boot instructions may, for example, be authenticated using public key 145 for the boot instructions. Using public key 145, processor 112 may analyze boot instructions 143 using their digital signature 144, which may be a hash value of boot instructions 143 that has been encrypted with the private key of the boot instructions. For example, processor 112, under the direction of pre-boot instructions 148, may decrypt digital signature 144 using public key 145 and perform a hash function on boot instructions 143. If the hash function produces the same value as the decrypted hash value, pre-boot instructions 148 may have a high confidence that boot instructions 143 are associated with the central processing unit and have not been tampered with.

Once pre-boot instructions 148 have authenticated boot instructions 143, boot instructions 143 may be launched (e.g., allowed to run). Boot instructions 143 may identify and initialize the hardware for system 100 and load an operating system, which may load and take over control of system 100. In certain implementations, the operating system may be authenticated by the boot instructions.

System 100 has a variety of features. For example, by being able to authenticate boot instructions 143, system 100 may be ensured of running authorized versions of software (e.g., operating systems), which may ensure that non-authorized operations are not performed. Thus, clients may be assured that they are receiving authorized computer systems from a computer system manufacturer (e.g., an OEM). Moreover, a computer system manufacturer may not be subject to negative assessments due to its products being modified. As another example, authentications may begin at the early instructions executed by the computer system and move forward, thereby establishing a chain of trust that can be used to authenticate other components. Furthermore, by sharing an authentication technique between two devices (e.g., central processing unit and boot device), it is more difficult to overcome the security features (e.g., by a part replacement attack) as there is a security relationship no matter which part is replaced.

As a further example, the authentication technique may be readily implementable even though the computer system manufacturer may receive components from a relatively large number of suppliers. As opposed to having the manufacturer of the central processing unit digitally sign every piece of software used by the computer system manufacturer, only one or more public keys of the computer system manufacturer need to be signed by the CPU manufacturer. The computer system manufacturer may then use its private keys to sign any components that it uses in creating the computer system, even if the development was outsourced.

Although FIG. 1 illustrates an example computer system in which boot instructions may be authenticated, other computer systems that authenticate boot instructions are possible. For example, pre-boot instructions 148 may be located on another device (e.g., on central processing unit 110). For instance, they may be in microcode or implemented as a hardware state machine on central processing unit 110. As another example, boot instructions public key(s) 145 may be located on another device (e.g., any device with non-volatile memory). As an additional example, a number of other computer system components may be present (e.g., buses, input/output devices, etc.). As a further example, a computer system may include a cache memory that is responsible for storing some of the data in the main memory. A processor may typically access cache memory faster than main memory and, hence, attempt to store the more commonly accessed data in the cache memory to speed up operations. The cache memory could be implemented on-chip or off-chip. As another example, a computer system may include a device to monitor communications between the central processing unit and the boot device to make sure they meet certain criteria, which may further enhance security.

Figure 2:
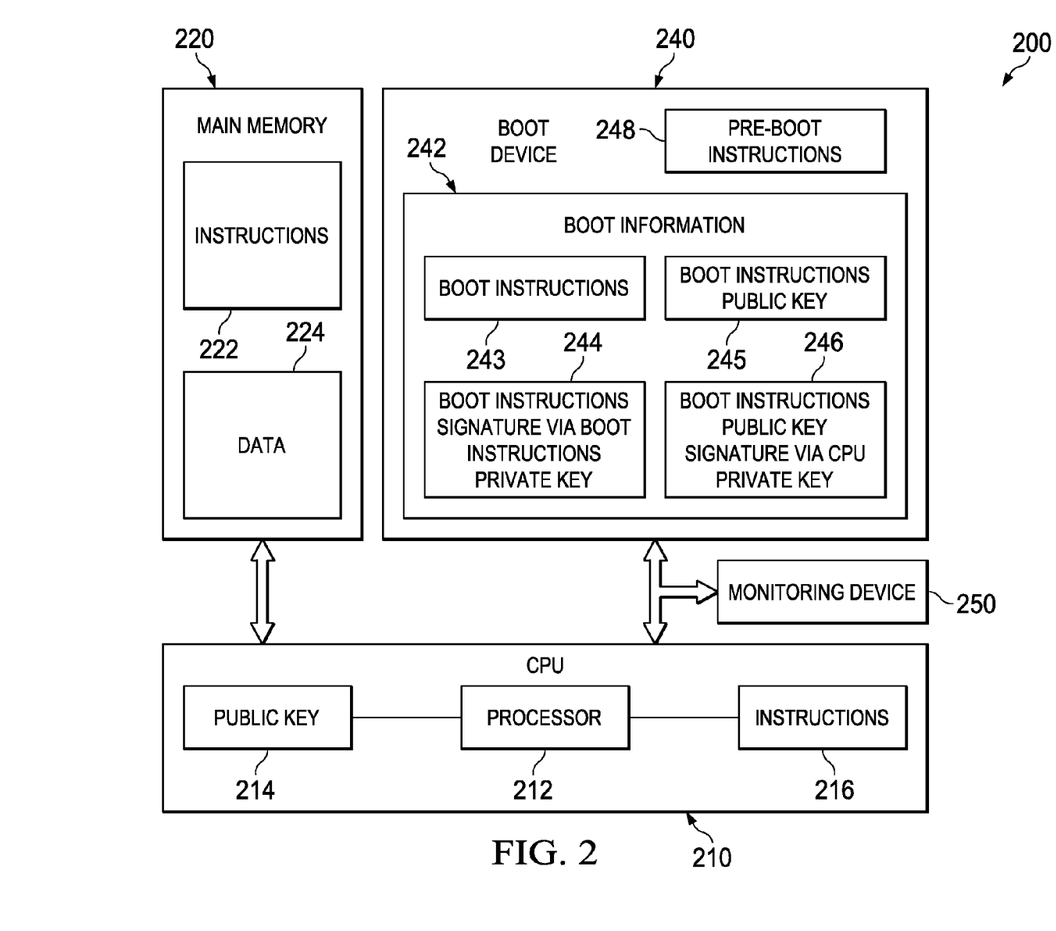
FIG. 2 is a block diagram illustrating another example system for authenticating computer system boot instructions in accordance with one embodiment of the present disclosure.

FIG. 2 illustrates another example system 200 for authenticating boot instructions. System 200 can include a central processing unit 210, main memory 220, secondary memory 230, and a boot device 240, and a monitoring device 250. Central processing unit 210 may be coupled to main memory 220, secondary memory 230, and boot device 240 through one or more chips that implement the core logic for system 200. In certain implementations, a logic chip set may include two chips, one for controlling faster capabilities and a second for controlling slower capabilities.

Central processing unit 210 can include a processor 212. Processor 212 can be responsible for processing data under the direction of instructions (e.g., from firmware and/or software). Processor 212 may, for example, include an execution core (e.g., having one or more arithmetic logical units) for processing data, an instruction fetch unit for fetching and ordering instructions for execution, and an instruction queue, to which the instruction fetch unit dispatches instructions and from which instructions are issued to the execution core for execution. Central processing unit 210 may also include registers for locally storing data and/or instructions.

Central processing unit 210 also includes a public key 214 and instructions 216. Public key 214, which may be an encryption key in a Public Key Cryptography system, can be associated with central processor unit 210 and can be stored in non-volatile memory. In particular implementations, for example, public key 214 may be encoded in central processing unit 210. Instructions 216 may be executed by processor 212 before attempting to access boot device 240. In particular implementations, instructions 216 may be microcode.

Main memory 220 can include instructions 222 and data 224. Instructions 222 may be an enlarged list of the instructions being executed by processor 212, which together form one or more programs. The programs may, for example, be applications and an operating system. Data 224 may be an enlarged set of the data be processed by processor 212. Thus, data 224 may be required for and produced by instructions 222. In particular implementations, main memory 220 may include RAM.

Boot device 240 can include boot information module 242 and pre-boot instructions module 248. Boot information module 242 can include boot instructions 243, which may, for example, identify and initialize hardware (e.g., video display card, keyboard, mouse, hard disk drive, and/or any other appropriate device) for system 200 and load an operating system. As will be discussed in more detail later, boot information module 242 also includes a digital signature 244 for boot instructions 243 that has been signed with a private key associated with the boot instructions, a public key 245 associated with the boot instructions, and a digital signature 246 for public key 245 that has been signed with a private key associated public key 214 of central processing unit 210.

Boot device 240 may, for example, be implemented on a chip, and may include non-volatile memory for storing boot information module 242 and pre-boot instructions 148. The non-volatile memory may, for example, be ROM, EEPROM, or Flash memory. Thus, although non-volatile, in particular implementations, the memory may be overwritten.

Monitoring device 250 can be adapted to monitor communications between central processing unit 210 and boot device 240 to determine whether they meet pre-defined criteria. Monitoring device 250 may, for example, be coupled to a bus between central processing unit 210 and boot device 240. To perform the monitoring operations, monitoring device 250 may include a processor, a microcontroller, a hardware state machine, an FPGA, an ASIC, or any other device that operates according to a set of logic. Monitoring device 250 may also include memory (e.g., registers, ROM, and RAM) to store the criteria and instructions. Monitoring device 250 may, for instance, be programmed with a state machine or microcode.

In certain modes of operation, when computer system 200 is being started (by a cold start or a warm start), central processing unit 210 first performs operations as dictated by instructions 216 before performing pre-boot instructions 248. In particular implementations, instructions 216 may dictate the authentication of pre-boot instructions 248. For example, pre-boot instructions 248 may be authenticated using public key 214 of central processing unit 210 by using a digital signature of the pre-boot instructions.

Once operations dictated by instructions 216 have been performed, boot instructions 243 may be authenticated. The boot instructions may, for example, be authenticated according to pre-boot instructions 248 by first validating public key 245 for the boot instructions. Public key 245 may, for example, be validated by using public key 214 of central processing unit 210 and a digital signature 246 of the boot instructions, which may be a hash value of the public key that has been encrypted with the private key of the central processing unit.

Once public key 245 for the boot instructions has been authenticated, boot instructions 243 may be authenticated. The boot instructions may, for example, be authenticated using public key 245 and a digital signature 244 of the boot instructions, which may be a hash value of the boot instructions that has been encrypted with the private key of the boot instructions.

Once boot instructions 243 have been authenticated, boot instructions 243 may be allowed to run. Thus, boot instructions 243 may identify and initialize the hardware for system 200 and load an operating system, which may load and take over control of computer system 200.

During the authentication of public key 244 and boot instructions 243, monitoring device 250 may monitor the communications between central processing unit 210 and boot device 240 to determine if they meet pre-defined criteria. For example, monitoring device 250 may understand when central processing unit 210 should jump and determine if that occurs. As another example, monitoring device 250 may capture a transaction, compute a hash value, and compare that with a pre-stored hash value to determine if they match. As an additional example, monitoring device 250 could examine state transitions. Furthermore, monitoring device 250 could compare code segments (e.g., on a bit-by-bit basis).

Additionally, monitoring device 250 could examine its environment. For example, the monitoring device could have circuitry that determines if the system's operating parameters are within specified ranges, as attackers often force a system to operate outside its normal operating range to determine if they can find a way to penetrate the system. The operating parameters may, for example, include environmental factors (e.g., temperature) and operational factors (e.g., voltages). Monitoring device 250 could also examine the physical composition of system 200. For instance, monitoring device 250 could include circuitry to determine if any of the traces coupling the monitoring device to the bus between the central processing unit and the boot device have been cut.

If monitoring device 250 determines that communications between central processing unit 210 and boot device 240 and/or the operating environment are not as expected, monitoring device 250 may interrupt operations of computer system 200. For example, monitoring device may shut down computer system 200, disable certain functions of computer system 200, or initiate an alarm.

System 200 has a variety of features. For example, by being able to authenticate boot instructions 243, system 200 may be ensured of running authorized versions of software (e.g., operating systems), which may assure that non-authorized operations are not performed. As another example, by sharing an authentication technique between three devices (e.g., central processing unit, boot device, and monitoring device), it is more difficult to remove the security features. For instance, even if entities were to pose as legitimate computer system manufacturers to a manufacturer of central processing units and have it sign their public keys so that their boot instructions could be authenticated, monitoring device 250 should be able to determine that the boot instructions are not authentic.

Although FIG. 2 illustrates one example computer system in which boot instructions may be authenticated, other computer systems authenticated boot instructions are possible. For example, pre-boot instructions 248 may be located elsewhere (e.g., on central processing unit 210). As another example, a number of other computer system components may be present (e.g., buses, input/output devices, secondary memory etc.). As an additional example, a computer system may include a cache memory that is responsible for storing some of the data in the main memory.

Figure 3:
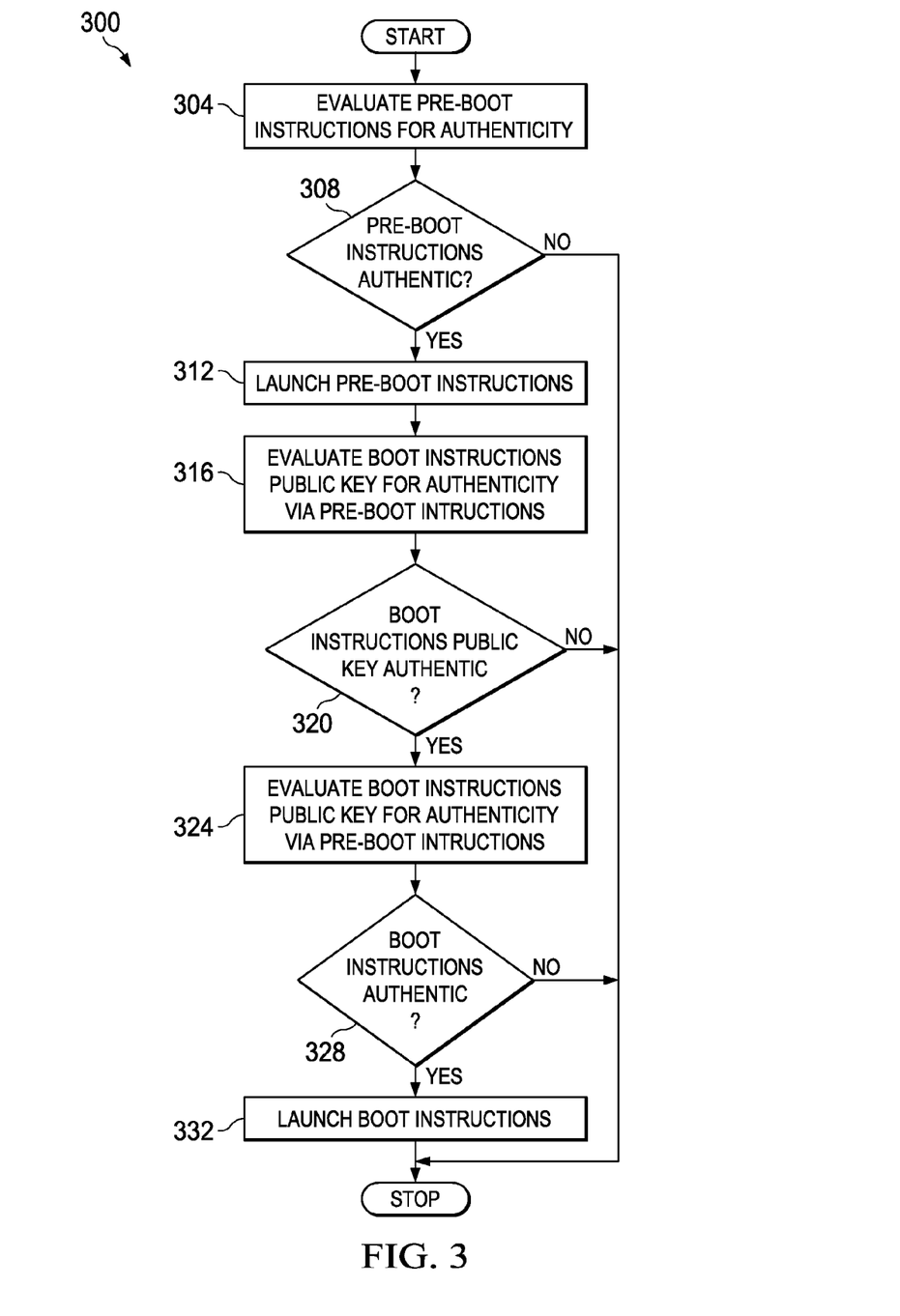
FIG. 3 is a flowchart illustrating an example process for authenticating computer system boot instructions in accordance with one embodiment of the present disclosure.

FIG. 3 illustrates an example process 300 for authenticating boot instructions. Process 300 may, for example, be implemented by a system similar to system 100. Process 300 may, for instance, begin when a computer is started or reset. Process 300 calls for evaluating pre-boot instructions for authenticity (operation 304). Pre-boot instructions are instructions executed before the boot instructions, which may, for example, include a basic input-output system. The pre-boot instructions may, for example, be evaluated according to microcode stored on a central processing unit.

The pre-boot instructions may, for instance, be evaluated based on a digital signature for the pre-boot instructions. For example, a central processing unit may authenticate the pre-boot instructions using a public key of the central processing unit. A digital signature of the pre-boot instructions may, for instance, be created by hashing the instructions and encrypting the hash value with the private key of the central processing unit. The central processing unit may then decrypt the digital signature using its public key and perform the same hash function on the pre-boot instructions. If the hash function produces the same value as the decrypted value, the central processing unit may have a high confidence that the pre-boot instructions are associated with it and have not been tampered with.

Process 300 also calls for determining whether the pre-boot instructions are authentic (operation 308). As just discussed, if a signed hash value is the same as a computed hash value, there is a high probability that the pre-boot instructions are authentic (e.g., associated with the central processing unit and unaltered). If the pre-boot instructions are not authentic, process 300 is at an end. The associated computer system may power down, attempt to reset, or perform any other appropriate function for when it has failed to launch its boot instructions. If the pre-boot instructions are authentic, process 300 continues with launching the pre-boot instructions (operation 312). The pre-boot instructions may, for example, be stored on the central processing unit or on a boot device and be responsible for, among other things, authenticating the boot instructions.

Process 300 also calls for using the pre-boot instructions to evaluate a public key for the boot instructions for authenticity (operation 316). The public key for the boot instructions may, for example, be stored on the boot device (with or separate from the boot instructions themselves). The public key for the boot instructions may, for example, be validated by using the public key of the central processing unit. Using its public key, central processing unit may analyze boot instruction publics key using its digital signature, which may be a hash value of the boot instructions public key that has been encrypted with the private key of the central processing unit. For example, the central processing unit, under the direction of the pre-boot instructions, may decrypt the digital signature using the central processing unit's public key, perform a hash function on the public key for the boot instructions, and compare values.

Process 300 also calls for determining whether the public key for the boot instructions is authentic (operation 320). For instance, if the hash function produces the same value as the decrypted hash value, there is a high confidence that the public key for the boot instructions is associated with the central processing and has not been tampered with. If the boot instructions public key is not authentic, process 300 is at an end.

If, however, the boot instructions public key is authentic, process 300 calls evaluating the boot instructions for authenticity according to the pre-boot instructions (operation 324). The boot instructions may, for example, be evaluated using the public key for the boot instructions and a digital signature for the boot instructions, which may be a hash value of the boot instructions that has been encrypted with the private key of the boot instructions. For example, the central processing unit, under the direction of the pre-boot instructions, may decrypt the digital signature using the boot instructions public key, perform a hash function on the boot instructions, and compare values. Process 300 also calls for determining whether the boot instructions are authentic (operation 328). For example, if the hash function produces the same value as the decrypted hash value, the central processing unit may have a high confidence that the boot instructions are authentic.

If the boot instructions are not authentic, process 300 is at an end. If, however, the boot instructions are authentic, process 300 calls for launching the boot instructions (operation 332). The boot instructions may then take over the set up of the computer system, and process 300 is at an end.

Although FIG. 3 illustrates one implementation of a process for authenticating computer system boot instructions, or processes for authenticating computer system boot instructions may include additional, fewer, and/or a different arrangement of operations. For example, a process may not include authenticating the pre boot instructions. As a further example, a process may include monitoring communications between a central processing unit and boot instructions to determine if the meet one or more pre-defined criteria.

Figure 4:
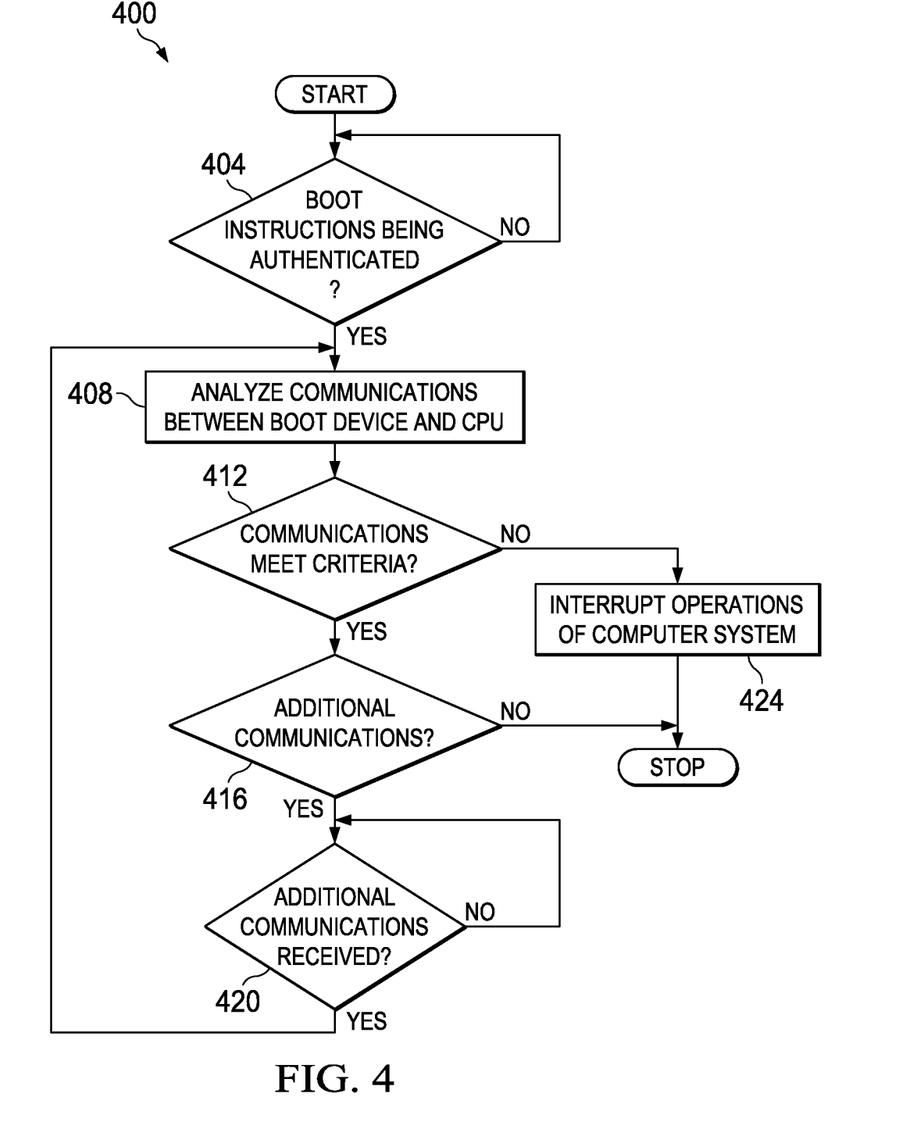
FIG. 4 is a flowchart illustrating another example process for authenticating computer system boot instructions in accordance with one embodiment of the present disclosure.

FIG. 4 illustrates an example process 400 for authenticating boot instructions. Process 400 may, for example, be implemented by a system similar to system 200. Process 400 may, for instance, begin after a computer is started or reset. Process 400 calls for determining whether boot instructions are being authenticated (operation 404). Determining whether boot instructions are being authenticated may be accomplished, for example, by monitoring communications between a boot device on which the boot instructions are stored and a central processing unit.

Once boot device instructions are being authenticated, process 400 calls for analyzing communications between the boot device and the central processing unit (operation 408). For example, communications could be analyzed to examine the data contained therein and/or state transitions of the central processing unit. Process 400 also calls for determining whether communications meet one or more pre-defined criteria (operation 412). The communications, and the data contained therein and/or revealed thereby, may, for example, meet the criteria if they match pre-stored configurations regarding the communications.

If the communications meet the criteria, process 400 calls for determining whether additional communications are anticipated (operation 416). If additional communications are expected, process 400 calls for waiting for the additional communications (operation 420) and then analyzing the communications (operation 408). If additional communications are not expected, process 400 is at an end.

If the communications do not meet the criteria, process 400 calls for interrupting computer system operations (operation 424). For example, the computer system may be shut down, certain computer system functions may be disabled, or an alarm may be initiated. Process 400 is then at an end.

System 100 and system 200 described and shown herein (and/or their associated structures) may include suitable interfaces for receiving, transmitting, and/or otherwise communicating data or information. Additionally, some of the processors and memories associated with systems 100 and 200 may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated system infrastructure has a myriad of substitute arrangements, design choices, device possibilities, hardware configurations, software implementations, equipment options, etc.

In some of example embodiments, one or more memory elements (e.g., main memory 120, secondary memory 130) can store data used for the operations described herein. This includes the memory being able to store instructions (e.g., software, logic, code, etc.) that are executed to carry out the activities described in this Specification. A processor can execute any type of instructions associated with the data to achieve the operations detailed herein in this Specification. In one example, processor 112 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in systems 100 and 200 can include one or more memory elements for storing information to be used in achieving operations associated with optimizing authentication and/or booting activities, as outlined herein. These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory.' Similarly, any of the potential processing elements, modules, and machines described in this Specification (e.g., digital signal processors (DSPs), microprocessors, ASICs, etc.) should be construed as being encompassed within the broad term 'processor.'

The flowcharts and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems that perform the specified function or acts, or combinations of special purpose hardware and computer instructions.

Aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more non-transitory computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modifications and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for authenticating computer system boot instructions, and several others have been mentioned or suggested. Moreover, those skilled in the art will readily recognize that a variety of additions, deletions, modifications, and substitutions may be made to these implementations while still achieving authentication of computer system boot instructions. Thus, the scope of the protected subject matter should be judged based on the following claims, which may capture one or more aspects of one or more implementations.

The invention claimed is:
1. A system, comprising:
 a boot device having a first memory comprising boot instructions and an associated public key and a second memory comprising pre-boot instructions;
 a processor having an associated public key, the processor configured to:
  determine whether the pre-boot instructions are authentic using the public key associated with the processor;

determine, if the pre-boot instructions are authentic, whether the public key associated with the boot instructions is authentic using the public key associated with the processor;

determine, if the public key associated with the boot instructions is authentic, whether the boot instructions are authentic using the public key associated with the boot instructions; and launch the boot instructions if the boot instructions are authentic; and a monitoring device coupled with the boot device and the processor, the monitoring device configured to:

monitor communications between the processor and the boot device during authentication associated with the boot instructions, and verify that the boot instructions are authentic by determining if the communications between the processor and the boot device during the authentication conform to one or more pre-defined criteria that specify expected communications during the authentication associated with the boot instructions.

2. The system of claim 1, wherein the processor is further configured to perform start-up operations that include determining whether the pre-boot instructions are authentic.

3. The system of claim 2, wherein the start-up operations comprise shutting down the system if the pre-boot instructions are not authentic.

4. The system of claim 2, wherein the processor is configured to perform start-up operations according to microcode.

5. The system of claim 1, wherein the processor is further configured to:

shut down the system if the public key associated with the boot instructions is not authentic; and shut down the system if the boot instructions are not authentic.

6. The system of claim 1, wherein the processor is configured to:

analyze a digital signature of the public key for the boot instructions using the public key associated with the processor to determine whether the public key for the boot instructions is authentic.

7. The system of claim 1, wherein the processor is configured to:

analyze a digital signature of the boot instructions using the public key for the boot instructions to determine whether the boot instructions are authentic.

8. The system of claim 1, wherein the boot instructions comprise a basic input-output system.

9. The system of claim 1, wherein the monitoring device is further configured:

monitor an operating environment during authentication associated with the boot instructions, and verify that the boot instructions are authentic by determining if the operating environment during the authentication conforms to one or more pre-defined criteria that specify expected system operating parameters during the authentication associated with the boot instructions.

10. The system of claim 1, wherein the monitoring device is further configured to:

interrupt system operations if the communications do not satisfy the pre-defined criteria.

11. The system of claim 10, wherein the monitoring device is configured to shut down the system to interrupt system operations.

12. A method comprising:

determining whether pre-boot instructions are authentic using a public key associated with a central processing unit;

determining whether a public key associated with boot instructions is authentic using the public key associated with the central processing unit;

determining whether the boot instructions are authentic using the public key associated with boot instructions;

launching the boot instructions if the boot instructions are authentic; and monitoring communications between the central processing unit and a boot device during authentication associated with the boot instructions, wherein the boot device stores the pre-boot instructions and the boot instructions, and verifying that the boot instructions are authentic by determining if the communications between the central processing unit and the boot device during the authentication satisfy one or more predefined criteria that specify expected communications during the authentication associated with the boot instructions.

13. The method of claim 12, wherein determining whether the a public key associated with boot instructions is authentic is performed according to the pre-boot instructions.

14. The method of claim 12, further comprising:

shutting down the central processing unit if the public key associated with the boot instructions is not authentic; and shutting down the central processing unit if the boot instructions are not authentic.

15. The method of claim 12, wherein determining whether a public key associated with the boot instructions is authentic comprises analyzing a digital signature of the public key using the public key associated with the central processing unit.

16. The method of claim 12, wherein determining whether the boot instructions are authentic comprises analyzing a digital signature of the boot instructions using the public key for the boot instructions.

17. The method of claim 12, further comprising:

interrupting system operations if the communications do not satisfy the predefined criteria.

18. The method of claim 17, wherein the interrupting includes shutting down the central processing unit.

19. Logic encoded on one or more non-transitory computer readable media for execution and when executed operable to:

determine whether pre-boot instructions are authentic using a public key associated with a central processing unit;

determine whether a public key associated with boot instructions is authentic using the public key associated with the central processing unit;

determine, if the public key associated with boot instructions is authentic, whether the boot instructions are authentic using the public key associated with boot instructions;

launch the boot instructions if the boot instructions are authentic; and monitor communications between the central processing unit and a boot device during authentication associated with the boot instructions, wherein the boot device stores the pre-boot instructions and the boot instructions, and verify that the boot instructions are authentic by determining if the communications between the central processing unit and the boot device during the authentication satisfy one or more predefined criteria that specify expected communications during the authentication associated with the boot instructions.

20. The logic of claim 19, wherein determining whether the public key associated with boot instructions is authentic is performed according to the pre-boot instructions.

21. The logic of claim 19, wherein the logic is further operable to:
shut down the central processing unit if the public key associated with the boot instructions is not authentic; and
shut down the central processing unit if the boot instructions are not authentic.

22. The logic of claim 19, wherein determining whether a public key associated with the boot instructions is authentic comprises evaluating a digital signature of the public key using the public key associated with the central processing unit.

23. The logic of claim 19, wherein determining whether the boot instructions are authentic comprises analyzing a digital signature of the boot instructions using the public key for the boot instructions.

24. The logic of claim 19, wherein the logic is further operable to:
interrupt system operations if the communications do not meet the pre-defined criteria.

25. The logic of claim 24, wherein interrupting system operations comprises shutting down the central processing unit.

* * * * *